United States Patent [19]
Lai et al.

[11] Patent Number: 5,887,074
[45] Date of Patent: Mar. 23, 1999

[54] LOCAL PRINCIPAL COMPONENT BASED METHOD FOR DETECTING ACTIVATION SIGNALS IN FUNCTIONAL MR IMAGES

[75] Inventors: Shang-Hong Lai, Plainsboro; Ming Fang, Cranbury, both of N.J.

[73] Assignee: Siemens Corporate Research, Inc., Princeton, N.J.

[21] Appl. No.: 764,383

[22] Filed: Dec. 13, 1996

[51] Int. Cl.$^6$ .................................................. G06K 9/46
[52] U.S. Cl. ........................................ 382/128; 382/204
[58] Field of Search .................................. 382/128–133, 382/203, 204, 276; 600/410; 324/304; 395/677

[56] References Cited

U.S. PATENT DOCUMENTS

| 5,379,352 | 1/1995 | Sirat et al. | 382/276 |
| 5,583,951 | 12/1996 | Sirat et al. | 382/276 |

OTHER PUBLICATIONS van Nostrand's Scientific Encyclopedia, Seventh Edition, Douglas M. Considine, P.E., Editor, Van Nostrand Reingold, New York; May 1989, pp. 1995–1998.

"Spatio–temporal Patterns in fMRI Data Revealed By Principal Component Analysis and Subsequent Low Pass Filtering", Mitra et al., SMRM Conf. 1995, p. 877. no month given.

(List continued on next page.)

Primary Examiner—Christopher S. Kelley
Attorney, Agent, or Firm—Adel A. Ahmed

[57] ABSTRACT

Apparatus for detecting activation signals in functional MRI images comprises MRI apparatus for deriving MRI volume data temporal signals for voxels in image slices, the data being grouped in segments respectively corresponding to active and inactive periods. The apparatus includes apparatus for selecting a core region within each segment, where data within a given core region represents a volume data subset of information within a given segment; for performing principal component analysis for each voxel, utilizing a plurality of volume segment data subsets, active and inactive, so as to result in n-dimensional vectors for each volume segment data subset, each vector containing n elements, where n is the dimension of each segment, and in n eigenvectors, one for each vector; for selecting a number of vectors having highest eigenvalues; for obtaining the inner product for each vector for each volume segment data subset and for number of vectors having highest eigenvalues, resulting in coefficients or projections of a number equal to the predetermined number for each volume segment data subset; for performing the foregoing steps for each voxel; for deriving the mean and standard deviations, utilizing the projections; for deriving an energy measure by taking the square root of the sum of the squares of the temporal signals corresponding to respective segments; for calculating a respective activation term for each voxel; and apparatus for displaying an image wherein respective gray scale values corresponding to the activation terms are assigned to activation terms located in respective coordinate positions.

23 Claims, 7 Drawing Sheets

OTHER PUBLICATIONS

"Potential Pitfalls of Principal Component Analysis of fMRI", Le et al., SMRM Conf. Apr. 1995, p. 820.

"Fuzzy Clustering Versus Principal Component Analysis of fMRI", Scarth et al., SMRM Conf., Nov. 1996, p. 1782.

"Paradigm–Free Fuzzy Clustering–Detected Activations in fMRI: A Case Study", Scarth et al., SMRM Conf. Nov. 1996, p. 1784.

"Clustering of Functional MR Data", Fischer et al., SMRM Conf., Nov. 1996, p. 1779.

"Numerical Recipes in C", Press et al., Cambridge University Press, Cambridge and New York, 1992, pp. 615–618. no month given.

"Aspect of a Multivariate Statistical Theory", John Wiley & Sons, Aug. 1992, pp. 380–389.

"Processing Strategies for Time–Course Data Sets in Functional MRI of the Human Brain", Bandettini et al., Magn. Reson. Med., vol. 30, pp. 161–173 July 1993.

"MR Imaging Signal Response to Sustained Stimulation in Human Visual Cortex", Hathout et al., JMRI, vol. 4, Apr. 1994, pp. 537–543.

"Functional Connectivity: The Principal–Component Analysis of Large (PET) Data Sets", Friston et al., Journal of Cerbral Blood Flow and Metabolism, Feb. 1993, pp. 5–14.

Hu et al, "Principal Component Analysis of Complex Spike Activity . . ." pp. 231–234, May 1992.

Soltanian–Zadeh et al, "A comparative Analysis of Several Transformation . . . " pp. 1759–1763, May 1994.

LOCAL PRINCIPAL COMPONENT BASED METHOD FOR DETECTING ACTIVATION SIGNALS IN FUNCTIONAL MR IMAGES

The present invention relates to Functional Magnetic Resonance Imaging (fMRI) and, more specifically to a local principal component method for detecting activation signals in functional MR images.

Functional Magnetic Resonance Imaging (fMRI) has recently been developed as a complementary method for the investigation of neural activities in the human brain. Details of magnetic resonance image are known and widely described in the literature. For example, Nuclear magnetic resonance imaging in a medical setting is described in van Nostrand's Scientific Encyclopedia, Seventh Edition, Douglas M. Considine, P. E., Editor, Van Nostrand Reingold, New York; 1989, pp. 1995–1998 and in the listing of additional reading materials listed therein.

However, the analysis of the fMRI signal for evaluating neural activity is not a simple task. Typically, what is of interest is the detection of differences of activity between (1) normal vs. diseased brains, or (2) different experimental conditions with the same subject. The signal change in the FMRI signal caused by some experimental activations, such as external stimulation by sound, light, or other stimulation, human body movement like finger tapping, or by the act of thinking and analyzing an object, is generally in the order of only a few percent. The detection of the activation signals in a human brain can be especially difficult where noise in the fMRI image is spatial varying and dominated by structural influences from physiological pulsations and patient movements. In addition, the fMRI activation signal can be spatially localized and, in some cases, even limited to just a few pixels.

In summary, the detection of fMRI signals faces the following difficulties: (1) the model of the activation signals caused by certain complicated stimulations, such as the thinking process, may not be known or available before their actual detection; (2) the activation signal in fMRI may be weak in the temporal domain when compared with other physiological related noise signals, such as the heart beat and respiration; (3) the activation signal in fMRI may be also weak in the spatial domain since only a few pixels may contain the actual activation signal being sought; and (4) there is also a possibility of misregistration between the functional images acquired at different times due to the patient and/or some physiological motion. This will further lower the already very low signal to noise ratio (S/N) of the activation signal to be detected.

In the following, a brief review is provided of some of the currently used and proposed methods for detecting the activation signals in the fMRI. These methods can be divided into the following two main categories: approaches based on known model signals; and methods which do not rely on such known model signals. This review is intended to serve as an introduction to the problem and the present inventive solution.

One commonly utilized algorithm in the first category is the cross-correlation technique. See, for example, Bandettini, P. A., et al., Magn. Reson. Med., Vol 30, pp 161, 1993. In this approach, activated pixels are identified as those that are highly correlated with a reference vector (a model signal) which characterizes activation induced signal change.

Another common technique is based on the statistical t-test method, which is also based on some explicit knowledge of the activation signal to be detected. See, for example, Hathout, G. M., et al., JMRI, Vol 4, pp 537, 1994. However, the identification of the pixels for the construction of the model signal involves making subjective decisions that are not always reliable or trivial. In addition, there are many possible complicated activations such as the thinking process which may not be at all easy for creating such a model signal. Nevertheless, the cross-correlation and the t-test method are among the most commonly utilized algorithms used in clinical practice, because of its simplicity and low computational cost.

In the second category, there are algorithms based on clustering techniques. See, for example, H. Fischer and J. Hennig, SMRM Conf., pp 1779, 1996; and G. Scarth, et al. SMRM Conf., pp 1784, 1996.

The clustering techniques have the advantage that no explicit knowledge of the true stimulation paradigm is required. The drawbacks of these methods, however, are twofold. First, the user has to give an appropriate number of clusters to the program for starting the clustering process in order to obtain reasonable clustering results. This is not always trivial. Second, after the clustering process, the user applies knowledge to interpret the results given by different clusters.

Principal component analysis (PCA) has also been applied to extract the activated regions and their time courses of activation without explicit knowledge of the activation process. See, for example, Tong Huu Le, B. S. and Xiaoping Hu, SMRM Conf., 1995; and Mitra, P. P. et al, SMRM Conf., 1995.

This method is based on the assumption that the activation is orthogonal to other signal variations such as brain motion, physiological signals (heard beat and respiration) and other uncorrelated noise for best separation. In many real applications, this assumption is not always valid. Since the PCA is computed from the entire MR image with its temporal signal, it may not be able to detect the activation signal if the temporal variation of the fMRI data is very different in different regions, such as different baseline drifts caused by the partial volume effect in different spatial regions in the image.

A voxel is defined as a basic data element in a three-dimensional volume data set.

A more common approach is the application of PCA to voxels identified from a prior statistical analysis, which requires again explicit knowledge of the activation paradigm. See, for example, G. Scarth and R. L. Somorjai, SMRM Conf., pp. 1782, 1996s; and Friston, K. et al. J. of Cerebral Blood Flow and Metabolism, Vol. 13, No. 1, pp 5, 1993.

Apparatus for detecting activation signals in functional MR images in accordance with an aspect of the invention comprises MRI apparatus for deriving MRI volume data temporal signals for voxels in image slices, said data being grouped in segments respectively corresponding to active and inactive periods. The apparatus further includes apparatus, preferably computer-implemented, for selecting a core region within each segment such that data within a given core region represents a volume data subset of information within a given segment; for performing principal component analysis (PCA) for each voxel, utilizing a plurality of volume segment data subsets, active and inactive, so as to result in n-dimensional vectors for each volume segment data subset, each vector containing n elements, where n is the dimension of each segment, and in n eigenvectors, one for each vector; for selecting a predetermined number of said vectors having highest eigenvalues; for obtaining the inner product for each of said n-dimensional vectors for each volume segment data subset and for each of said predetermined number of said vectors having highest eigenvalues, resulting in coefficients or projections of a number equal to said predetermined number for each volume segment data subset; for performing the foregoing steps for each voxel; for deriving the mean and standard deviations, utilizing said projections; for deriving an energy measure by taking the square root of the sum of the squares of said temporal signals corresponding to respective segments; for calculating a respective activation term for each voxel; and means for displaying an image wherein respective gray scale values corresponding to said activation terms are assigned to activation terms located in respective coordinate positions.

In accordance with an aspect of the invention, a computer-implemented method for detecting activation signals in functional MR images, utilizing MRI volume data temporal signals for voxels in image slices, the data being grouped into active and inactive segments respectively corresponding to active and inactive periods, the method comprises the steps of selecting a core region within each segment such that data within a given core region represents a volume data subset of information within a given segment; for one voxel, performing principal component analysis (PCA) for each voxel, utilizing a plurality of volume segment data subsets, active and inactive, so as to result in n-dimensional vectors for each volume segment data subset, each vector containing n elements, where n is the dimension of each segment, and in n eigenvectors, one for each vector; selecting a predetermined number of the vectors having highest eigenvalues; obtaining the inner product for each of the n-dimensional vectors for each volume segment data subset and for each of the predetermined number of the vectors having highest eigenvalues, resulting in coefficients or projections of a number equal to the predetermined number for each volume segment data subset; performing the foregoing steps for each voxel; deriving the mean and standard deviations for the active and inactive segments, utilizing the projections; deriving an energy measure by taking the square root of the sum of the squares of the temporal signals corresponding to respective segments; calculating a respective activation term for each voxel; and displaying an image wherein respective gray scale values corresponding to the activation terms are assigned to activation terms located in respective coordinate positions.

In accordance with a further aspect of the invention, the core region is selected so as to avoid data in transitions between active and inactive segments. In accordance with a further aspect of the invention, the core region is located medially between a pair of oppositely-going transition regions. In accordance with a further aspect of the invention, the predetermined numbers is 3.

In accordance with an aspect of the invention, a computer-implemented method for utilizing a local principal component for detecting activation signals in functional magnetic resonance images, the images being represented by original three-dimensional volume MRI data, the method comprises the steps of:

(a) performing background segmentation on the original three-dimensional volume MRI data, wherein at least a portion of voxels comprised a respective temporal signal f(x,y,z,t) and at least a portion exhibit respective zeros;

(b) identifying voxels classified as background;

(c) assigning activation measure values to zeros for the voxels classified into the background level and skipping them for further processing;

(d) partitioning the respective temporal signal f(x, y, z, t) at each voxel (x, y, z) into active and inactive segments, wherein each such segment represents a sample taken from a center part of each of the active or inactive segment, the segments being made of equal length by discarding the beginning and the ending portions of the respective temporal signal;

(e) perform a local principal component analysis utilizing a specified number, up to all, of the inactive-period and active-period temporal segments of each voxel;

(f) identifying a number M of most dominant M principal components for each voxel computed from step (e);

(g) projecting respective inactive-period temporal segments and active-period temporal segments onto the M principal components;

(h) storing a distribution of projections derived in step (g);

(i) computing a respective mean and a standard deviation from the distribution of projections stored step (h) for the inactive-period temporal segments and active-period temporal segments;

(j) computing an activation measure at each voxel (x, y, z) in accordance with the equation:

$$\text{Activation}(x, y, z) = (\_f^{(a)}\_ - \_f^{(i)}\_) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1.

In accordance with a further aspect of the invention, apparatus for detecting activation signals in functional MR images comprises MRI apparatus for deriving MRI volume data temporal signals for voxels in image slices, the data being grouped in segments respectively corresponding to active and inactive periods, the apparatus including: apparatus for selecting a core region within each segment such that data within a given core region represents a volume data subset of information within a given segment; apparatus for performing principal component analysis (PCA) for each voxel, utilizing a plurality of volume segment data subsets, active and inactive, so as to result in n vectors for each volume segment data subset, each vector containing n elements, where n is the dimension of each segment, and in n eigenvectors, one for each vector; apparatus for selecting a predetermined number of the vectors having highest eigenvalues; apparatus for obtaining the inner product for each of the n-dimensional vectors for each volume segment data subset and for each of the predetermined number of the vectors having highest eigenvalues, resulting in coefficients or projections of a number equal to the predetermined number for each volume segment data subset; apparatus for performing the foregoing steps for each voxel; deriving the mean and standard deviations, utilizing the projections; apparatus for deriving an energy measure by taking the square root of the sum of the squares of the temporal signals corresponding to respective segments; apparatus for calculating a respective activation term for each voxel; and apparatus for displaying an image wherein respective gray scale values corresponding to the activation terms are assigned to activation terms located in respective coordinate positions.

In accordance with a further aspect of the invention, an MRI activation map is formed by a computer-implemented method for detecting activation signals in functional MRI images, utilizing MRI volume data temporal signals for voxels in image slices, the data being grouped into active and inactive segments respectively corresponding to active and inactive periods, the method comprising the steps of:

selecting a core region within each segment such that data within a given core region represents a volume data subset of information within a given segment;

for one voxel, performing principal component analysis (PCA) for each voxel, utilizing a plurality of volume segment data subsets, active and inactive, so as to result in n-dimensional vectors for each volume segment data subset, each vector containing n elements, where n is the dimension of each segment, and in n eigenvectors, one for each vector;

selecting a predetermined number of the vectors having highest eigenvalues;

obtaining the inner product for each of the n-dimensional vectors for each volume segment data subset and for each of the predetermined number of the vectors having highest eigenvalues, resulting in coefficients or projections of a number equal to the predetermined number for each volume segment data subset;

performing the foregoing steps for each voxel;

deriving the mean and standard deviations for the active and inactive segments, utilizing the projections;

deriving an energy measure by taking the square root of the sum of the squares of the temporal signals corresponding to respective segments;

calculating a respective activation term for each voxel; and displaying an image wherein respective gray scale values corresponding to the activation terms are assigned to activation terms located in respective coordinate positions for forming the activation map.

The invention will be more fully understood from the following detailed description in conjunction with the drawing, in which FIGS. 1A–1D show (a) a slice of the MRI volume data, (b) the activation map obtained by using the conventional t-test method, (c) the activation map obtained by using the local PCA based method in accordance with the present invention, and (d) the temporal signal of the point with the highest activation map value;

Figure 1A:
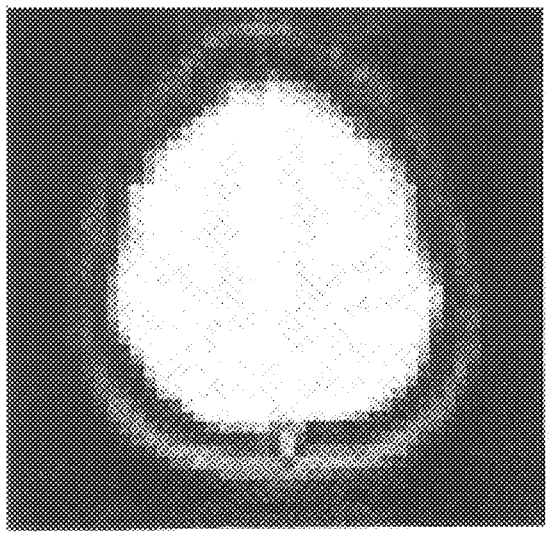
Figure 1B:
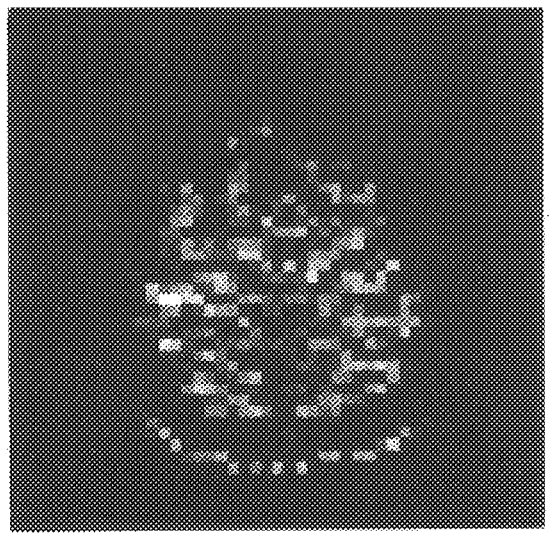
Figure 1C:
Figure 1D:
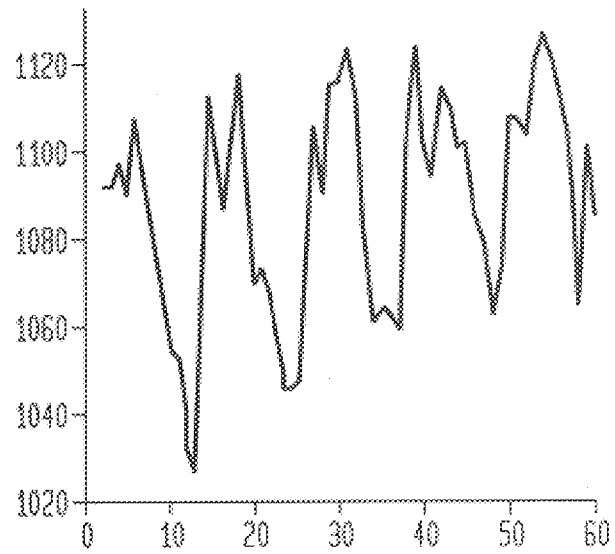

In accordance with an aspect of the present invention, a local principal component analysis (PCA) based method does not require explicit knowledge of the activation model signal while providing a good detection of weak activation signals in fMRI data. In accordance with the method, an algorithm is utilized in the principal component analysis (PCA) for detecting the activation signals in fMRI. In this algorithm, the most dominant principal components are extracted for each voxel from the inactive-period as well as active-period signal segments in the neighborhood of the voxel. This procedure is herein referred to as local PCA, or LPCA.

An activation measure at each voxel is then computed based on the distribution of the projections of the inactive-period temporal signals and active-period temporal signals at this voxel onto the most dominant local principal components. The activation measure is large when the projections of the inactive-period signals are distributed remotely from those of the active-period signals, and is small when they are not.

"Paradigm" as herein used signifies a given desired basis of stimulus or activity for which correlation is sought in the events being monitored. For example, if activity or stimulation of a subject is plotted as a "1" or "0" level on a Cartesian ordinate and time is plotted on the abscissa, the paradigm might resemble a rectangular wave representation. Thus, periods of finger-tapping or visual light stimulation could appear as "up" or positive-portions of a rectangular wave, that is "active" portions, and periods of inactivity or non-stimulation could appear as zero-level or "down" portions, that is "inactive" portions of the square wave representation.

Corresponding to a given paradigm, there will be found a related time function of a monitored quantity, such as brain MRI changes, which indicated possibly correlated activity and of which the efficient detection is a goal of the present invention. Up and down wave portions will correspond to "active" or "inactive" portions of the paradigm.

It is herein recognized that the transitions between the up and down portions of the related time function tend to contribute less reliable information for purposes of detecting truly correlated events. Accordingly, only a portion of the related time function is herein utilized, preferably a central or "core" portion located intermediately in time between a given pair of oppositely-going transitions. Thus, such a core region can be located in the middle of an up portion of a wave, between the up-going transition and the down-going transition.

Preferably, in accordance with the present invention, these core regions or samples are made of equal length throughout a particular evaluation sample. If time width of such a core region, or sample, is to remain constant, it is herein recognized that it must be sufficiently narrow or of sufficiently short duration so as to fit within the narrowest or shortest wave portions resulting from the particular paradigm being used. It will be understood that the data within a given core region will represent a volume data subset of the subset represented by each portion of the related time function, as derived from an MRI image. Within such a data subset, the smallest element of information, defined by three coordinates for the three-dimensional data under consideration, is referred to as a "voxel", in accordance with common practice and analogously to a "pixel" in a two-dimensional image.

Principal component analysis (PCA) is then performed for each voxel, utilizing every volume segment data subset, active and inactive. If each volume segment data subset is of dimension n, that is, if it contains n values, the PCA will result in n eigenvectors for that volume segment data subset, each vector containing n elements. There will result n eigenvalues, one for each eigenvector. As was explained, the operations thus far are being performed in reference to one voxel. An arbitrary number of vectors having the highest eigenvalues is then selected. In accordance with a preferred embodiment of the present invention, three such vectors are selected, each being an n-dimensional vector.

Next, the inner product is derived for each of the n-dimensional vectors for each volume segment data subset and each of the three vectors selected as having the highest eigenvalues, resulting in three coefficients for each volume segment data subset. These coefficients are herein referred to as the projections of the n-dimensional vectors for each volume segment data subset to the respective three vectors selected as having the highest eigenvalues.

The foregoing processing operations are performed for each voxel. Next, utilizing the above-defined projections, the mean and standard deviation are computed. A respective "energy level" for N signal components is derived for active and inactive volume segment data subsets by taking the square root of the sum of the squares of N temporal signals corresponding to those respective segments.

Thereafter, an Activation term is calculated for all voxels, resulting in a set of Activation terms, one for each voxel coordinate point, (x,y,z). These are then preferably plotted, z being the coordinate position of each image and x,y being the coordinates within the respective image. In order to make optimal use of the gray scaly available, normalization is desirably performed. The highest Activation term value is determined for all (x,y,z) and each Activation term is multiplied by the ratio of the number of gray scale steps, typically 255, divided by the highest Activation term value.

More specifically the steps of the method in accordance with the invention are performed as follows in an exemplary embodiment.

(a) Perform background segmentation on the original three-dimensional (3D) volume MRI data. This can be conveniently performed, for example, by a simple thresholding procedure.

(b) Assign the activation measure values to zeros for the voxels classified into the background and skip them for further processing.

(c) Partition the temporal signal f(x, y, z, t) at each voxel (x, y, z) into active and inactive segments based on the paradigm of the fMRI procedure. Each segment is taken from the center part of each active or inactive period with equal length by discarding the beginning and the ending portions of the signal. The basis for this is that these portions correspond to the transition periods in the paradigm and are therefore less discriminative for separating the active and inactive segments. All the segments are taken with equal length for later local PCA computation.

(d) Use a group of voxels of the inactive-period as well as active-period temporal segments of each voxel to perform the local principal component analysis. However, the local principal component analysis can also be applied to all active and inactive segments in the neighborhood of each voxel. Thus, for example, all segments from the 8 nearest neighbor voxels in each slice can be used in the local principal component analysis process.

(e) Using the most dominant M principal components for each voxel computed from the previous step, project their inactive-period temporal segments and active-period segments onto these M principal components.

The most dominant M principal components are defined as the M components with the greatest eigenvalues which are derived by the PCA computation. These M principal components construct an M-dimensional space wherein temporal MRI signals for each voxel can be projected.

(f) Compute the respective means and the standard deviations from the distributions of the projections computed in the previous step for the inactive-period segments and active-period segments.

(g) Compute an activation measure at each voxel (x, y, z) as follows:

$$\text{Activation}(x, y, z) = (\|f^{(a)}\| - \|f^{(i)}\|) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

equation where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1. The computed Activation (x,y,z) function for all voxels in the fMRI volume data is herein referred to as a 3-D activation map.

Note that the first multiplication factor to the entire summation on the right-hand side is the energy difference between the active-period signal and inactive-period signal. This is because it is anticipated that the energy in the active period is larger than the energy in the inactive period for the activation signal. Inside the summation, the first factor is the j-th eigenvalue's power of c and the other factor is the measure of separation between two distributions, i.e. active and inactive clusters. The former is used to assign the weighting of the separation measure at the j-th principal component, and the latter is the separation measure between the distributions of projections for the active and inactive segments.

This separation measure is similar to the measure in the "Student's t test" for two different distributions of random variables in statistics. When applying the concept of standard error, the conventional statistic for measuring the significance of a difference of means is termed Student's t. This is described in, for example, "Numerical Recipes in C", by William H. Press et al., Cambridge University Press Cambridge and New York; 1992 at page 615 et seq. This measure is generalized for two distributions in a multi-dimensional space by using the weighted sum of all separation measures in different orthogonal directions. For the weighting, the associated eigenvalue is used with power c for each principal component. When the power is 1, the eigenvalues are used directly as the weights. When the power is chosen to be 0, it means uniform weighting for all directions. The power c has been set to 0.5 in experiments which indicated that this weighting can produce reasonable results. Using the above procedures, the 3D activation map for the fMRI can be obtained.

The computed activation map can be interpreted as the likelihood of the neural activation caused by a designated stimulation occurring at each voxel location. It is noted that, unlike other existing cross-correlation based methods, the method of the present invention does not require an assumption of any prior knowledge of the model activation signal utilized in the method.

The local PCA is used to find the most important bases from both inactive-period (or baseline) and active-period signals. The algorithm utilized in accordance with the present invention can easily detect the signal not only when its inactive-period segments are very different from the active-period segments, but also when the segments are very similar in both active and inactive periods, respectively. Here, the difference and similarity are measured in a few of the local principal component bases since only interested in the global shape variations along time in the neighborhood are of interest.

The method in accordance with the instant invention utilizing the present proposed algorithm has been applied to the detection of the neural activation in the fMRI for a finger tapping experiment. The data set is a time sequence of 3D volume MRI data, acquired by a multislice EPI (Echo-planar Imaging, a fast MRI method) sequence. The images have an isotropic spatial resolution of 3 mm. Each EPI sequence needs 100 msec for each image, thus requiring 1.6 sec for each volume having 16 planar images. The entire data set contains 61 time instances of such volume MRI data. The 3-D MRI data is obtained by stacking 16 slices of MR images. The time gap between two consecutive time instances is about 3 seconds. A slice of the MRI data at the 9th time instance is shown in FIG. 1($a$). FIG. 1($b$) shows the activation map from the same slice computed by the conventional t-test method. See the aforementioned article by Hathout, G. M., et al., JMRI, Vol 4, pp 537, 1994. In principle, the t-test method assumes the model activation signal is a step function response for a stimulus, that is, from an inactive period to an active period.

The performance of the t-test method strongly depends on the validity of this assumption. However, this assumption is ad hoc and could be invalid for other kinds of complicated stimulations. Furthermore, the baseline drift artifact and some high frequency noise due to some physiological influences could make this assumption even more invalid.

FIG. 1 shows (a) a slice of the MRI volume data, (b) the activation map obtained by using the conventional t-test method, (c) the activation map obtained by using the local PCA based method in accordance with the present invention, (d) the temporal signal of the point with the highest activation map value. The SNR in the activation map produced by the method in accordance with the present invention is about four times the SNR for the t-test method. (See text for details.) This means that the present method is more powerful in discriminating the activation signals from the baseline signals FIG. 1($c$) shows an activation map obtained by using the LPCA method in accordance with the invention, which does not assume any model activation signal. Only two principal components are utilized to compute the activation measure, that is, M=2. Comparing FIGS. 1($b$) and 1($c$), it is apparent that the activation map produced by the method in accordance with the present invention exhibits better SNR (signal-to-noise ratio) than that produced by the t-test method. The SNR is defined as the ratio of the largest normalized value to the mean of the normalized values at the non-background points. Here the normalization is performed to make the ranges of the activation values the same for different methods. The SNR of the activation map produced by the method in accordance with the present invention is about four times greater than the SNR obtained by the t-test method.

Figure 2A:
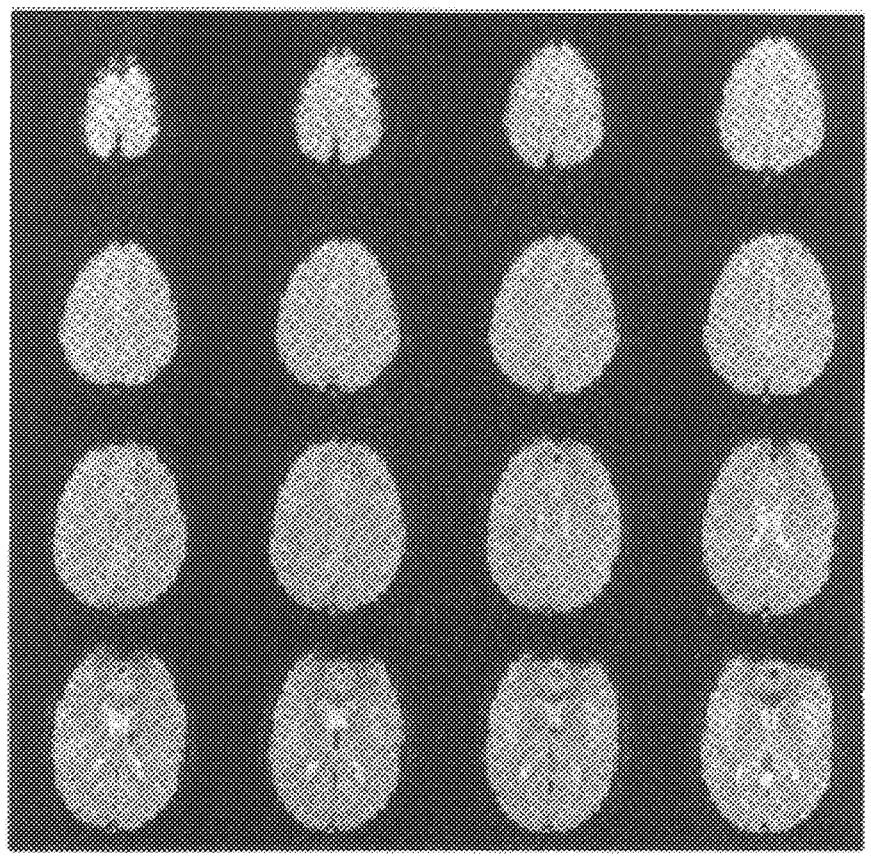
FIGS. 2A–2B show (a) The concatenation of 16 slices of the fMRI volumetric data at one time instance during the motoric experiment. (b) The paradigm of the fMRI experiment with non-periodic periods, in which 0 denotes inactive state and 1 denotes active state.
Figure 2B:
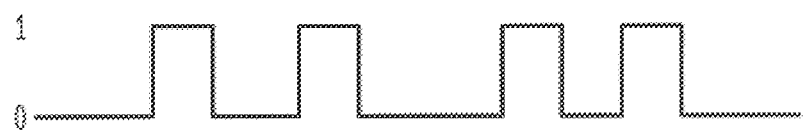

It is apparent from the foregoing that the method in accordance with the invention is more effective in discriminating in favor of the activation signals from the baseline signals for this data set. The temporal signal at the strongest activation site detected by the present method is shown in FIG. 1($d$). The other experiments contain four different stimulations, that is, motoric stimulus, sensoric stimulus, phasic pain and tonic pain, under the same non-periodic paradigm as shown in FIG. 2($b$). FIG. 2($a$) shows the concatenation of all the 16 slices of the volumetric MR images at one time instance for the motoric experiment. The t-test method and the LPCA method in accordance with the invention was applied to these data sets.

FIG. 2 shows (a) The concatenation of 16 slices of the fMRI volumetric data at one time instance during the motoric experiment. (b) The paradigm of the fMRI experiment with non-periodic periods, in which 0 denotes inactive state and 1 denotes active state.

Figure 3A:
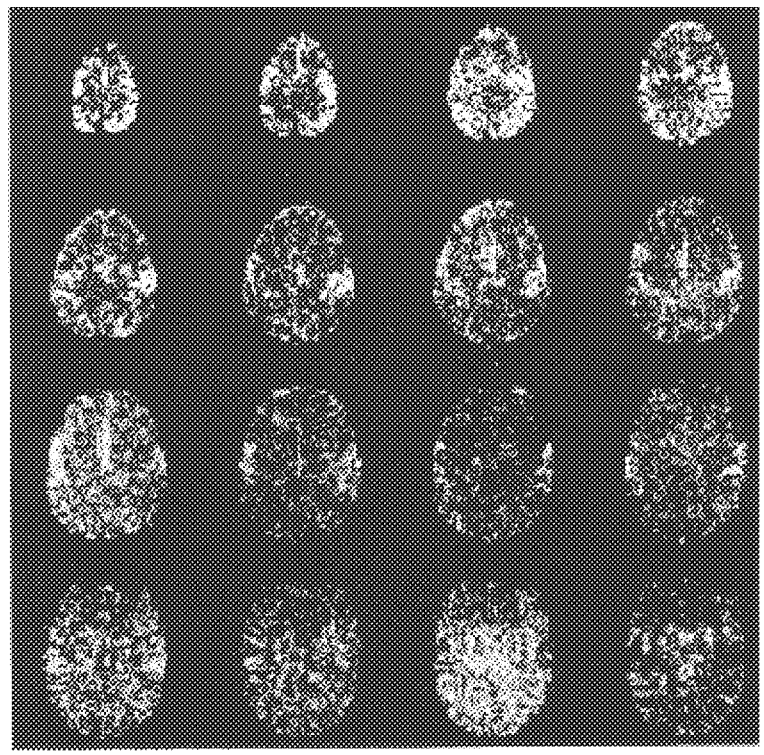
FIGS. 3A–3B show the activation map for the motoric experiment using (a) t-test method and (b) the LPCA method in accordance with the present invention.
Figure 3B:
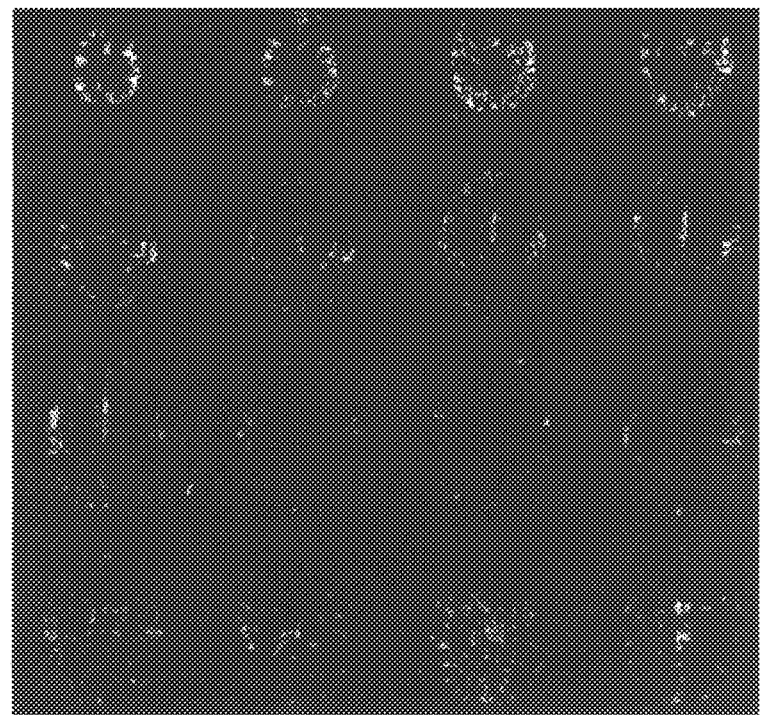
Figure 4A:
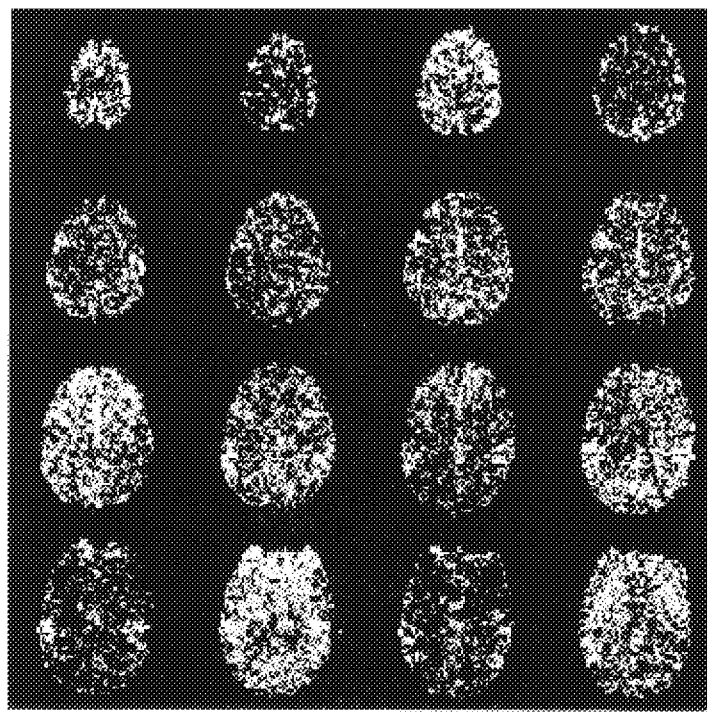
FIGS. 4A–4B show the activation map for the sensoric experiment using (a) t-test method and (b) the present LPCA method.
Figure 4B:
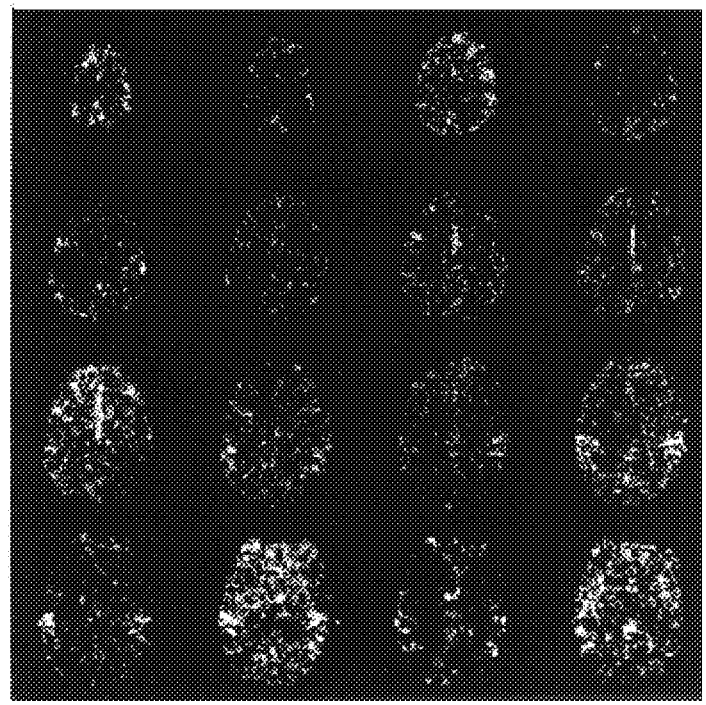

The activation maps produced by the t-test method and the LPCA method for the motoric experiment are shown in FIGS. 3($a$) and 3($b$), respectively. The present LPCA method renders a more localized activation signal. For the SNR's of the activation maps, the present LPCA method is 8.96 times better than the t-test method. FIGS. 4($a$) and 4($b$) show the activation maps for the sensoric experiment using the t-test method and the present LPCA method. The SNR of the LPCA method in this case is about 4.59 times better than the t-test method.

FIG. 3 shows the activation map for the motoric experiment using (a) t-test method and (b) the LPCA method in accordance with the present invention. The SNR in the activation map for the LPCA method is about 8.96 times the SNR of the t-test method.

FIG. 4 shows the activation map for the sensoric experiment using (a) t-test method and (b) the present LPCA method. The SNR in the activation map for the LPCA method is about 4.59 times the SNR of the t-test method.

Figure 5A:
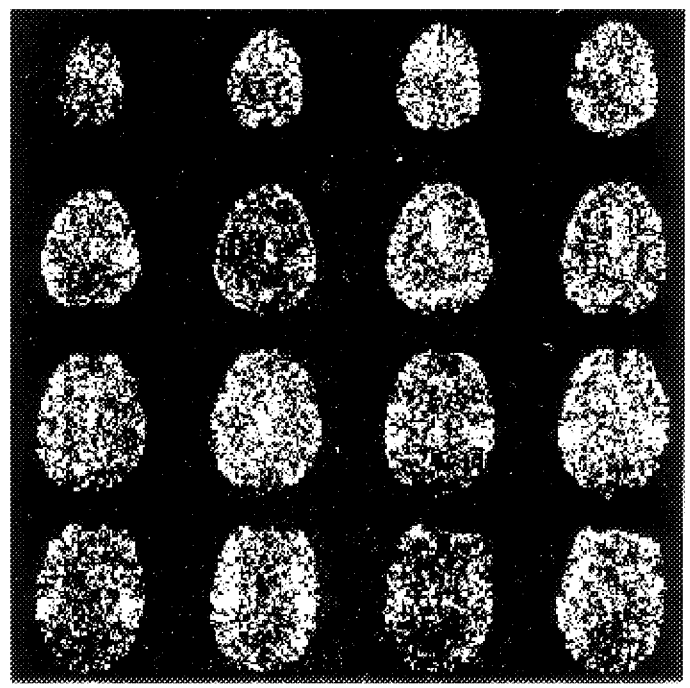
FIGS. 5A–5B show the activation map for the phasic pain experiment using (a) t-test method and (b) the LPCA method in accordance with the present invention.
Figure 5B:
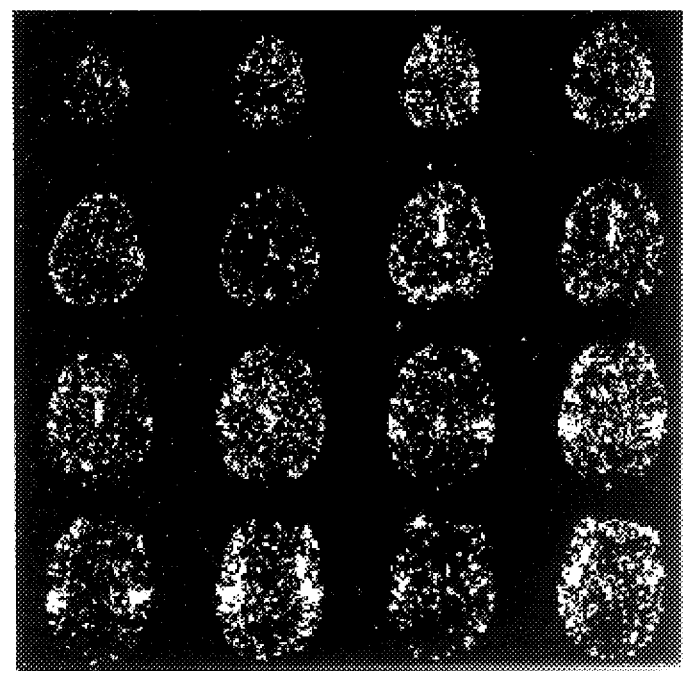

Similarly, for the phasic pain and tonic pain experiments, the activation maps produced by these two methods are shown in FIGS. 5($a$),($b$) and 6($a$),($b$), respectively. In this case, the LPCA method in accordance with the present invention again exhibits better SNR than the t-test method, that is, 3.96 times better for the phasic pain and 6.24 times better for the tonic pain. In general, the present LPCA method provides a significant signal-to-noise ratio improvement in the detection of functional activation signal for all experiments conducted. An average SNR improvement of 594% has been achieved for all experiments. This significant SNR improvement can make the activation signal detection and localization much easier and more precise, especially when the actual activation signal is weak.

FIG. 5 shows the activation map for the phasic pain experiment using (a) t-test method and (b) the LPCA method in accordance with the present invention. The SNR in the activation map for the LPCA method is about 3.96 times the SNR of the t-test method.

Figure 6A:
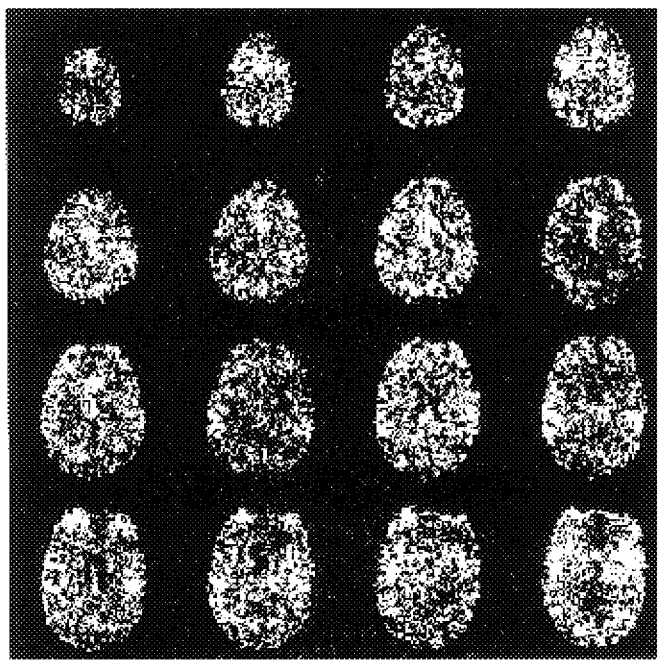
FIGS. 6A–6B show the activation map for the tonic pain experiment using (a) t-test method and (b) the LPCA method in accordance with the present invention.
Figure 6B:
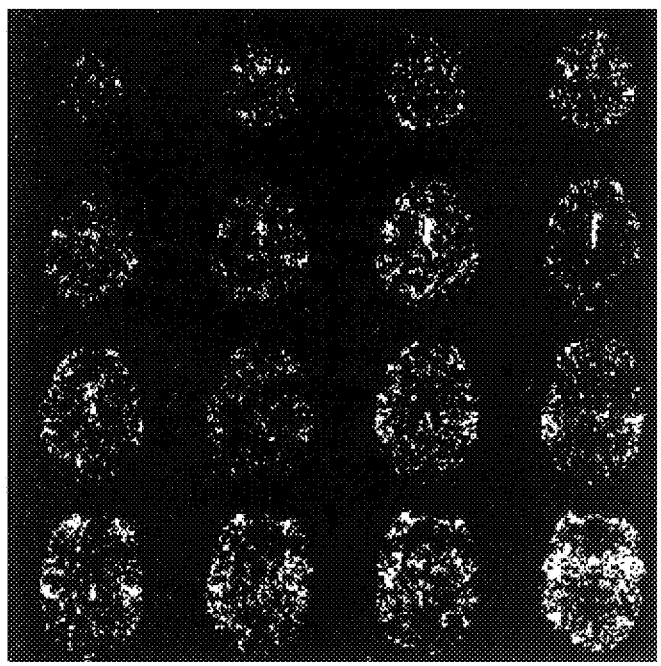

FIG. 6 shows the activation map for the tonic pain experiment using (a) t-test method and (b) the LPCA method in accordance with the present invention. The SNR in the activation map for the LPCA method is about 6.24 times the SNR of the t-test method.

Figure 7:
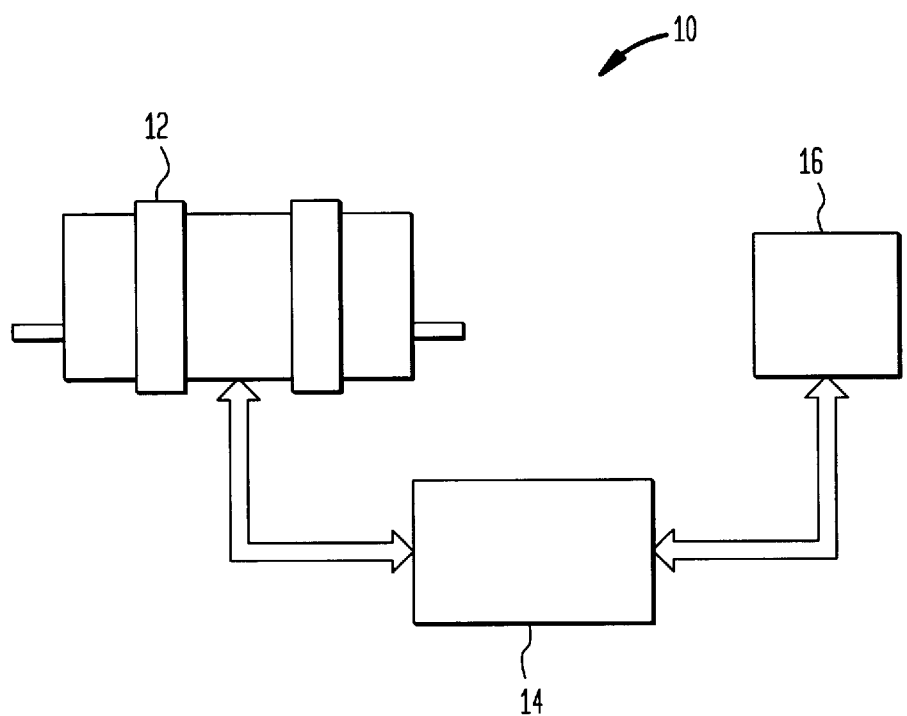
FIG. 7 shows a general overview of apparatus in accordance with the invention.

An overview of an arrangement of the apparatus, generally indicated as 10 is shown in FIG. 7. 12 is an MRI machine, operated in conjunction with a programmable computer 14. The processed images are then displayed in a display 16.

As has been stated above, the utilization of the present algorithm in accordance with the present invention does not require explicit knowledge of the activation model signal. Only a rough division of the time signal into baseline and active period is needed. This is very important if an activation process is too complicated to be modelled explicitly or is unknown.

The local PCA can capture the time course at each voxel very well so that the algorithm is not sensitive to the baseline drift problem due to the partial volume effect caused by small misregistration and other factors. Both the cross correlation technique and the t-test method can be affected by this baseline drift artifact.

The LPCA based algorithm in accordance with the invention is also insensitive to some high-frequency noise possibly caused by heart beat and respiration. Because of its insensitivity to the baseline drift and some high-frequency noise, the LPCA provides in general better SNR than the commonly used t-test method. It is noted that the present algorithm is only insensitive to small misregistration. For large misregistration due to patient motion, it is still necessary to perform the flexible registration before applying the algorithm.

While the invention has been described by way of exemplary embodiments, it will be understood that various changes and modifications will be apparent to those of skill in the art. For example, in a preferred embodiment of the present invention, three vectors having the highest eigenvalues were selected. Clearly, another number can be used. Furthermore, a different sampling position for the segment core can be utilized. It will be understood that such changes and the like can be made without departing from the spirit and scope of the invention which is defined by the claims following.

What is claimed is:

1. A computer-implemented method for detecting activation signals in functional MRI images, utilizing MRI volume data temporal signals for voxels in image slices, said data being grouped into active and inactive segments respectively corresponding to active and inactive periods, said method comprising the steps of:

selecting a core region within each segment such that data within a given core region represents a volume data subset of information within a given segment;

for one voxel, performing principal component analysis (PCA) for each voxel, utilizing a plurality of volume segment data subsets, active and inactive, so as to result in n-dimensional vectors for each volume segment data subset, each vector containing n elements, where n is the dimension of each segment, and in n eigenvectors, one for each vector;

selecting a predetermined number of said vectors having highest eigenvalues;

obtaining the inner product for each of said n-dimensional vectors for each volume segment data subset and for each of said predetermined number of said vectors having highest eigenvalues, resulting in coefficients or projections of a number equal to said predetermined number for each volume segment data subset;

performing the foregoing steps for each voxel;

deriving the mean and standard deviations for said active and inactive segments, utilizing said projections;

deriving an energy measure by taking the square root of the sum of the squares of said temporal signals corresponding to respective segments;

calculating a respective activation term for each voxel; and displaying an image wherein respective gray scale values corresponding to said activation terms are assigned to activation terms located in respective coordinate positions.

2. A method for detecting activation signals in functional MRI images in accordance with claim 1, wherein said core region is selected so as to avoid data in transitions between active and inactive segments.

3. A method for detecting activation signals in functional MRI images in accordance with claim 2, wherein said core region is located medially between a pair of oppositely-going transition regions.

4. A method for detecting activation signals in functional MRI images in accordance with claim 1, wherein said predetermined numbers is 3.

5. A method for detecting activation signals in functional MRI images in accordance with claim 1, wherein said activation term is derived at each voxel (x, y, z) in accordance with the relationship $$\text{Activation}(x, y, z) = (\_f^{(a)}\_ - \_f^{(i)}\_) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1.

6. A method for detecting activation signals in functional MRI images in accordance with claim 1, wherein said respective gray scale values corresponding to said activation terms are normalized.

7. A method for detecting activation signals in functional MRI images in accordance with claim 1, wherein said respective gray scale values corresponding to said activation terms are normalized by determining a highest activation term value for all (x,y,z) and each activation term is multiplied by the ratio of an available number of gray scale steps, divided by said highest activation term value.

8. A computer-implemented method for utilizing a local principal component for detecting activation signals in functional magnetic resonance images, said images being represented by original three-dimensional volume mri data, said method comprising the steps of:

(a) performing background segmentation on said original three-dimensional volume MRI data, wherein at least a portion of voxels comprised a respective temporal signal f(x,y,z,t) and at least a portion exhibit respective zeros;

(b) identifying voxels classified as background;

(c) assigning activation measure values to zeros for said voxels classified into said background level and skipping them for further processing;

(d) partitioning said respective temporal signal f(x, y, z, t) at each voxel (x, y, z) into active and inactive segments, wherein each such segment represents a sample taken from a center part of each of said active or inactive segment, said segments being made of equal length by discarding the beginning and the ending portions of said respective temporal signal;

(e) perform a local principal component analysis utilizing a specified number, up to all, of said inactive-period and active-period temporal segments of each voxel;

(f) identifying a number M of most dominant M principal components for each voxel computed from step (e);

(g) projecting respective inactive-period temporal segments and active-period temporal segments onto said M principal components;

(h) storing a distribution of projections derived in step (g);

(i) computing a respective mean and a standard deviation from the distribution of projections stored step (h) for said inactive-period temporal segments and active-period temporal segments;

(j) computing an activation measure at each voxel (x, y, z) in accordance with the equation:

Activation (x, y, z) =

$$(\_f^{(a)}\_ - \_f^{(i)}\_) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1.

9. Apparatus for detecting activation signals in functional MRI images, comprising:

MRI apparatus for deriving MRI volume data temporal signals for voxels in image slices, said data being grouped in segments respectively corresponding to active and inactive periods, said including:

means for selecting a core region within each segment such that data within a given core region represents a volume data subset of information within a given segment;

means for performing principal component analysis (PCA) for each voxel, utilizing a plurality of volume segment data subsets, active and inactive, so as to result in n vectors for each volume segment data subset, each vector containing n elements, where n is the dimension of each segment, and in n eigenvectors, one for each vector;

means for selecting a predetermined number of said vectors having highest eigenvalues;

means for obtaining the inner product for each of said n-dimensional vectors for each volume segment data subset and for each of said predetermined number of said vectors having highest eigenvalues, resulting in coefficients or projections of a number equal to said predetermined number for each volume segment data subset;

means for performing the foregoing steps for each voxel;

deriving the mean and standard deviations, utilizing said projections;

means for deriving an energy measure by taking the square root of the sum of the squares of said temporal signals corresponding to respective segments;

means for calculating a respective activation term for each voxel; and means for displaying an image wherein respective gray scale values corresponding to said activation terms are assigned to activation terms located in respective coordinate positions.

10. Apparatus for detecting activation signals in functional MRI images in accordance with claim 9, wherein said core region is selected so as to avoid data in transitions between active and inactive segments.

11. Apparatus for detecting activation signals in functional MRI images in accordance with claim 10, wherein said core region is located medially between a pair of oppositely-going transition regions.

12. Apparatus for detecting activation signals in functional MRI images in accordance with claim 9, wherein said predetermined numbers is 3.

13. Apparatus for detecting activation signals in functional MRI images in accordance with claim 1, wherein said activation term is derived at each voxel (x, y, z) in accordance with the relationship Activation (x, y, z) =

$$(\_f^{(a)}\_ - \_f^{(i)}\_) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1.

14. Apparatus for detecting activation signals in functional MRI images in accordance with claim 13, wherein said respective gray scale values corresponding to said activation terms are normalized.

15. Apparatus for detecting activation signals in functional MRI images in accordance with claim 9, wherein said respective gray scale values corresponding to said activation terms are normalized by determining a highest activation term value is determined for all (x,y,z) and each activation term is multiplied by the ratio of an available number of gray scale steps, divided by said highest activation term value.

16. An MRI activation map, formed by a computer-implemented method for detecting activation signals in functional MRI images, utilizing MRI volume data temporal signals for voxels in image slices, said data being grouped into active and inactive segments respectively corresponding to active and inactive periods, said method comprising the steps of:

selecting a core region within each segment such that data within a given core region represents a volume data subset of information within a given segment;

for one voxel, performing principal component analysis (PCA) for each voxel, utilizing a plurality of volume segment data subsets, active and inactive, so as to result in n-dimensional vectors for each volume segment data subset, each vector containing n elements, where n is the dimension of each segment, and in n eigenvectors, one for each vector;

selecting a predetermined number of said vectors having highest eigenvalues;

obtaining the inner product for each of said n-dimensional vectors for each volume segment data subset and for each of said predetermined number of said vectors having highest eigenvalues, resulting in coefficients or projections of a number equal to said predetermined number for each volume segment data subset;

performing the foregoing steps for each voxel;

deriving the mean and standard deviations for said active and inactive segments, utilizing said projections;

deriving an energy measure by taking the square root of the sum of the squares of said temporal signals corresponding to respective segments;

calculating a respective activation term for each voxel; and displaying an image wherein respective gray scale values corresponding to said activation terms are assigned to activation terms located in respective coordinate positions for forming said activation map.

17. An MRI activation map in accordance with claim 16, wherein said core region is selected so as to avoid data in transitions between active and inactive segments.

18. An MRI activation map in accordance with claim 16, wherein said core region is located medially between a pair of oppositely-going transition regions.

19. An MRI activation map in accordance with claim 16, wherein said predetermined numbers is 3.

20. An MRI activation map in accordance with claim 16, wherein said activation term is derived at each voxel (x, y, z) in accordance with the relationship Activation $(x, y, z) =$ $$(\|f^{(a)}\| - \|f^{(i)}\|) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1.

21. An MRI activation map in accordance with claim 16, wherein said respective gray scale values corresponding to said activation terms are normalized.

22. An MRI activation map in accordance with claim 16, wherein said respective gray scale values corresponding to said activation terms are normalized by determining a highest activation term value for all (x,y,z) and each activation term is multiplied by the ratio of an available number of gray scale steps, divided by said highest activation term value.

23. An MRI activation map formed by a computer-implemented method for utilizing a local principal component for detecting activation signals in functional magnetic resonance images, said images being represented by original three-dimensional volume mri data, said method comprising the steps of:

(a) performing background segmentation on said original three-dimensional volume MRI data, wherein at least a portion of voxels comprised a respective temporal signal f(x,y,z,t) and at least a portion exhibit respective zeros;

(b) identifying voxels classified as background;

(c) assigning activation measure values to zeros for said voxels classified into said background level and skipping them for further processing;

(d) partitioning said respective temporal signal f(x, y, z, t) at each voxel (x, y, z) into active and inactive segments, wherein each such segment represents a sample taken from a center part of each of said active or inactive segment, said segments being made of equal length by discarding the beginning and the ending portions of said respective temporal signal;

(e) perform a local principal component analysis utilizing a specified number, up to all, of said inactive-period and active-period temporal segments of each voxel;

(f) identifying a number M of most dominant M principal components for each voxel computed from step (e);

(g) projecting respective inactive-period temporal segments and active-period temporal segments onto said M principal components;

(h) storing a distribution of projections derived in step (g);

(i) computing a respective mean and a standard deviation from the distribution of projections stored step (h) for said inactive-period temporal segments and active-period temporal segments;

(j) computing an activation measure at each voxel (x, y, z) in accordance with the equation:

Activation $(x, y, z) =$ $$(\_f^{(a)}\_ - \_f^{(i)}\_) \sum_{j=1}^{M} (\lambda_j)^c \frac{|m_j^{(a)}(x, y, z) - m_j^{(i)}(x, y, z)|}{\sqrt{\sigma_j^{(a)}(x, y, z)^2 + \sigma_j^{(i)}(x, y, z)^2}}$$

where the symbols m and σ stand for mean and variance, respectively, the superscripts (i) and (a) denote inactive and active periods, respectively, λ is the eigenvalue computed from the above local PCA analysis and the subscript j is the index for the principal component, the value of the power c is usually between 0 and 1.

\* \* \* \* \*